United States Patent
Cotterman et al.

(10) Patent No.: US 12,366,844 B2
(45) Date of Patent: Jul. 22, 2025

(54) PERFORMANCE TUNING OF A MATERIALS HANDLING VEHICLE

(71) Applicant: Crown Equipment Corporation, New Bremen, OH (US)

(72) Inventors: Brad Cotterman, New Bremen, OH (US); Ray Denison, New Bremen, OH (US); Justin Miller, New Bremen, OH (US); Mike LeVan, New Bremen, OH (US)

(73) Assignee: Crown Equipment Corporation, New Bremen, OH (US)

( * ) Notice: Subject to any disclaimer, the term of this patent is extended or adjusted under 35 U.S.C. 154(b) by 405 days.

(21) Appl. No.: 17/444,569

(22) Filed: Aug. 6, 2021

(65) Prior Publication Data
US 2022/0043427 A1 Feb. 10, 2022

Related U.S. Application Data

(60) Provisional application No. 63/062,432, filed on Aug. 6, 2020.

(51) Int. Cl.
  *G05B 19/4155* (2006.01)
  *B66F 9/075* (2006.01)
  (Continued)

(52) U.S. Cl.
  CPC ...... *G05B 19/4155* (2013.01); *B66F 9/07581* (2013.01); *G05D 1/0027* (2013.01);
  (Continued)

(58) Field of Classification Search
  None
  See application file for complete search history.

(56) References Cited

U.S. PATENT DOCUMENTS 5,430,243 A * 7/1995 Shioda ............... G10H 1/0066
  84/645
10,078,611 B1 * 9/2018 Paravada ............... G06F 13/20
  (Continued)

FOREIGN PATENT DOCUMENTS

| EP | 2886507 A1 * | 6/2015 | ............ B66F 17/003 |
| JP | 6260166 B2 * | 1/2018 | ............ B60K 35/00 |
| WO | WO-2008074008 A2 * | 6/2008 | ............ B60K 35/00 |

OTHER PUBLICATIONS

International Search Report and Written Opinion of the International Searching Authority dated Nov. 18, 2021; International Application No. PCT/US2021/044869; European Patent Office; Rijswijk, Netherlands.
(Continued)

*Primary Examiner* — Redhwan K Mawari
*Assistant Examiner* — Kai Wang
(74) *Attorney, Agent, or Firm* — Stevens & Showalter LLP

(57) ABSTRACT

A materials handling vehicle receives a wirelessly communicated performance tuning profile, and responsive thereto, adjusts at least one operating capability. The performance tuning profile can be updated dynamically as the materials handling vehicle is operated in a work environment based upon a number of different factors including operational, operator, environmental, other, or combinations thereof. Additional aspects provide a graphical user interface that allows an individual such as a supervisor to create a library of performance tuning profiles, and create and/or program a rules engine to automatically convey an appropriate performance tuning profile to a corresponding materials handling vehicle responsive to detecting a corresponding event associated with a programmed rule.

19 Claims, 8 Drawing Sheets

(51) Int. Cl.
*G05D 1/00* (2006.01)
*G06F 16/9035* (2019.01)

(52) U.S. Cl.
CPC ....... *G05D 1/0038* (2013.01); *G06F 16/9035* (2019.01); *G05B 2219/31454* (2013.01)

(56) References Cited

U.S. PATENT DOCUMENTS

| | | | |
|---|---|---|---|
| 10,429,831 B2 | 10/2019 | Thomson et al. | |
| 2007/0088465 A1* | 4/2007 | Heffington | G07C 5/085 701/1 |
| 2008/0046910 A1* | 2/2008 | Schultz | H04N 21/6582 725/12 |
| 2008/0086717 A1* | 4/2008 | Brunn | G06F 8/34 717/117 |
| 2014/0325953 A1* | 11/2014 | Patterson | F16H 7/02 56/500 |
| 2014/0340013 A1* | 11/2014 | Li | B60L 15/025 318/722 |
| 2015/0103566 A1* | 4/2015 | Keogh | H02M 3/33507 363/21.12 |
| 2015/0326900 A1* | 11/2015 | Yoshizawa | H04N 21/6582 725/9 |
| 2016/0147228 A1* | 5/2016 | Riski | B63H 1/02 701/21 |
| 2016/0368508 A1* | 12/2016 | Manci | B60W 50/0205 |
| 2018/0237010 A1* | 8/2018 | Choi | B60W 50/085 |
| 2019/0392357 A1* | 12/2019 | Surti | G06Q 10/047 |
| 2020/0079333 A1* | 3/2020 | Ballesteros | B61L 27/12 |
| 2020/0398992 A1* | 12/2020 | Morrison | B64D 27/24 |

OTHER PUBLICATIONS

Baharlou, Simin; International Preliminary Report on Patentability dated Feb. 16, 2023; International Application No. PCT/US2021/044869; The International Bureau of WIPO; Geneva, Switzerland.

Xie Rong; Notification of the First Office Action dated Apr. 11, 2025; Chinese Application No. 2021800577040; China National Intellectual Property Office; Beijing, China.

Cotterman, Brad; Related U.S. Appl. No. 19/240,142 entitled "Performance Tuning of a Materials Handling Vehicle", filed on Jun 17, 2025; United States Patent and Trademark Office; Alexandria, Virginia.

\* cited by examiner

PERFORMANCE TUNING OF A MATERIALS HANDLING VEHICLE

CROSS REFERENCE TO RELATED APPLICATIONS

This application claims the benefit of U.S. Provisional Patent Application Ser. No. 63/062,432, filed Aug. 6, 2020, entitled "PERFORMANCE TUNING OF A MATERIALS HANDLING VEHICLE", the disclosure of which is hereby incorporated by reference.

BACKGROUND

Various aspects herein relate generally to controlling the operating performance of materials handling vehicles, and more particularly to the monitoring, management, control, and combinations thereof, of the operating performance of materials handling vehicles.

Materials handling vehicles are commonly used for picking and moving stock in facilities such as warehouses and distribution centers. Such vehicles typically include a power unit and a load handling assembly, which may include load carrying forks. An operator's compartment can also be provided, which includes necessary instrumentation and controls for operating the vehicle.

Moreover, wireless strategies are deployed by various enterprises to improve the efficiency and accuracy of operations. For instance, in a typical warehouse implementation, a forklift truck is equipped with a communications device that links a corresponding forklift truck operator to a management system executing on an associated computer enterprise via a wireless transceiver. Essentially, the communications device is used as an interface to the management system to direct the tasks of the forklift truck operator, e.g., by instructing the forklift truck operator where and/or how to pick, pack, put away, move, stage, process or otherwise manipulate items within a facility.

BRIEF SUMMARY

A system is provided for controlling the performance of a fleet of materials handling vehicles. The system comprises a central database, a remote processor, and a fleet of materials handling vehicles. The central database stores electronic performance tuning profiles. The remote processor is coupled to memory, and is programmed by instructions in the memory that cause the remote processor to monitor activity of the fleet of materials handling vehicles to detect triggering events. Upon detecting a triggering event, the remote processor wirelessly transmits an electronic performance tuning profile selected from the electronic performance tuning profiles stored in the central database, to a corresponding materials handling vehicle in the fleet of materials handling vehicles. The corresponding materials handling vehicle includes a control module having a processor that receives the wirelessly transmitted electronic performance tuning profile, and communicates at least one command across a vehicle network of the materials handling vehicle to modify performance of the materials handling vehicle according to a setting in the received electronic performance tuning profile. Moreover, a display on the materials handling vehicle outputs an indication that a performance tuning adjustment was made to the materials handing vehicle.

In some embodiments, a graphical user interface running on the display on the materials handling vehicle prompts a vehicle operator to accept or decline the received performance tuning profile. In some variations of this embodiment, the display includes an attribution that shows the vehicle operator at least one factor that drove the performance tuning adjustment.

In some embodiments, the display outputs a graphical view of the current electronic performance tuning profile, and allows a vehicle operator to interact with the graphical view to adjust the performance tuning on the vehicle. For instance, the vehicle operator may be able to adjust down one or more performance settings, and cannot adjust up any displayed performance settings.

In some embodiments, the remote processor retrospects a history over a predetermined time window, of vehicle data (e.g., vehicle data associated with a vehicle operator, other data, etc.) to determine whether to trigger a change to an electronic performance tuning profile.

In some embodiments, the modified performance of the materials handling vehicle comprises at least one of: maximum speed; maximum acceleration; maximum braking; maximum lift height; maximum lift speed; maximum lift acceleration; maximum lift deceleration; maximum load weight; use of blending; or use of an automation feature of the materials handling vehicle.

In some embodiments, the triggering event is defined by one or more factors. For instance, the triggering event can be defined by detecting that the materials handling vehicle engaged in a new application; the triggering event can be defined by detecting that the materials handling vehicle engaged in a new task; the triggering event can be defined by detecting that the materials handling vehicle encountered a new operating condition; the triggering event can be defined by detecting that the materials handling vehicle encountered a new environmental condition; the triggering event can be defined by detecting that an operator logged onto the materials handling vehicle, combinations thereof, etc.

In some embodiments, the display outputs an indication of the performance tuning settings, which can optionally trigger a response from the vehicle operator. For instance, the display can output a message to the vehicle operator indicating that the control module has received a new performance tuning profile from the remote source, where the display provides an input for the operator to accept or reject the new performance tuning profile. Responsive thereto, an acknowledgement is communicated back to the remote server. Here, the acknowledgement is stored in a data source that stores data associated with the vehicle operator. The display can also output an affirmation to the vehicle operator related to a performance tuning profile setting.

In some embodiments, a graphical user interface, e.g., a web interface, provides a programming interface to create new performance tuning profiles and to store the performance tuning profiles in a database. The graphical user interface can also provide a programming interface to create new rules dictating when a materials handling vehicle should load a new performance tuning profile.

Moreover, a computer implemented process for controlling the performance of a fleet of materials handling vehicles comprises storing in a central database, electronic performance tuning profiles. The process also comprises monitoring activity of a fleet of materials handling vehicles to detect triggering events. Upon detecting a triggering event, a remote processor wirelessly transmits an electronic performance tuning profile selected from the electronic performance tuning profiles stored in the central database, to a corresponding materials handling vehicle in the fleet of materials handling vehicles that is associated with the triggering event. The process yet further comprises receiving the wirelessly transmitted electronic performance tuning profile by the corresponding materials handling vehicle, and communicating at least one command across a vehicle network of the corresponding materials handling vehicle to modify performance of the materials handling vehicle according to a setting in the electronic performance tuning profile. Still further, the process comprises displaying on a display of the materials handling vehicle, an indication that a performance tuning adjustment was made to the materials handing vehicle.

Still further, a system for controlling the performance of a materials handling vehicle comprises a central database that stores electronic performance tuning profiles and a remote processor that is coupled to memory. The remote processor is programmed by instructions in the memory that cause the remote processor to monitor activity of a fleet of materials handling vehicles to detect triggering events. Upon detecting a triggering event, the remote processor wirelessly transmits an electronic performance tuning profile selected from the electronic performance tuning profiles stored in the central database, to a corresponding materials handling vehicle in the fleet of materials handling vehicles.

The corresponding materials handling vehicle includes a control module having a processor that receives the wirelessly transmitted electronic performance tuning profile, and communicates at least one command across a vehicle network of the materials handling vehicle to modify performance of the materials handling vehicle according to a setting in the electronic performance tuning profile. Moreover, a display on the materials handling vehicle outputs at least one widget that visually represents an indication that a performance tuning adjustment was made to the materials handing vehicle. Also, an input/output that allows a vehicle operator to interact with the at least one widget to modify the current performance tuning profile, and upon change to the current performance tuning profile, communicate at least one command across the vehicle network of the materials handling vehicle to modify performance of the materials handling vehicle according to the modified setting in the electronic performance tuning profile. In some embodiments, the materials handling vehicle operator can only reduce settings below a maximum setting in the current performance profile instance.

Figure 1:
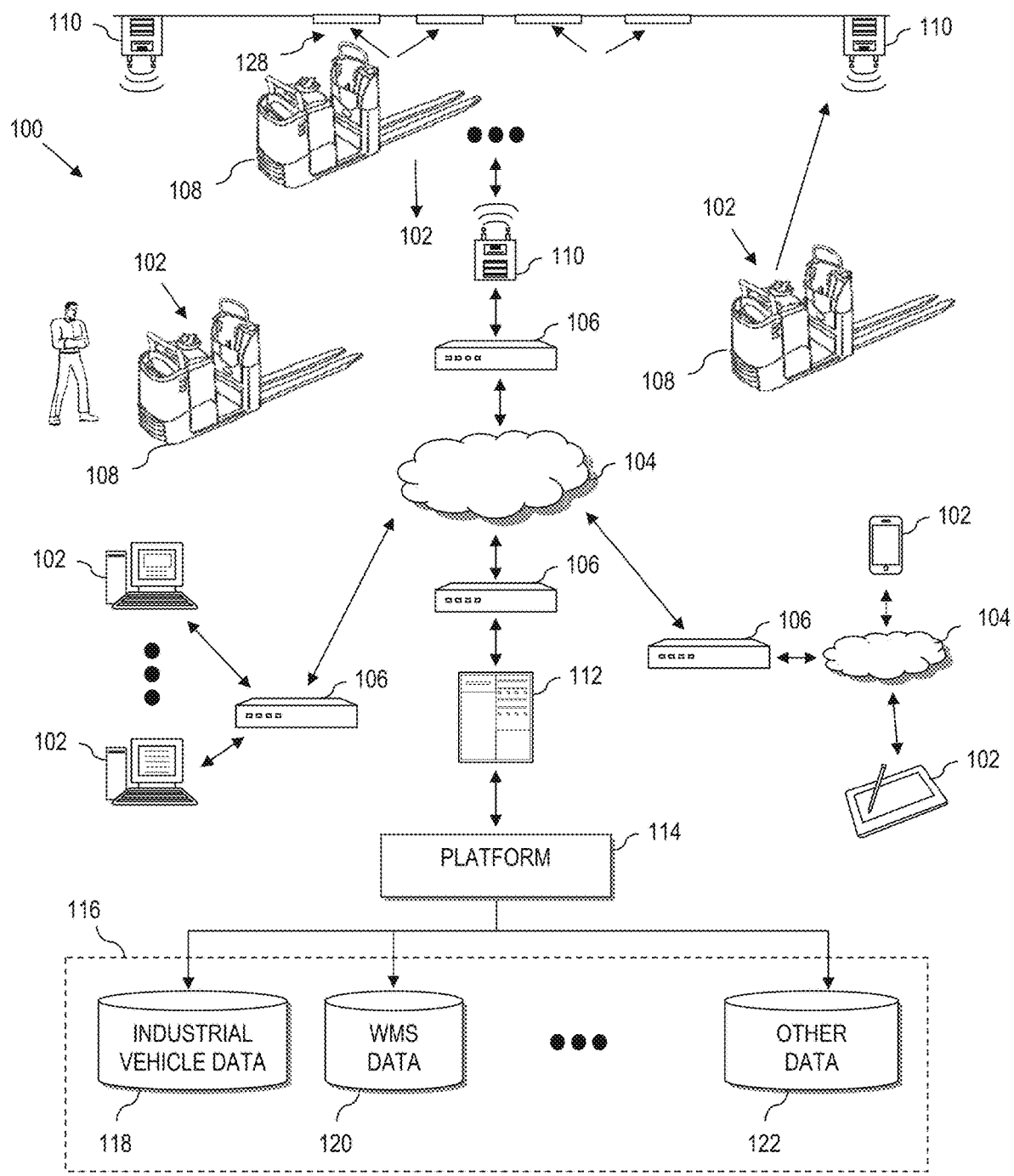
FIG. 1 is a schematic view of an environment in which materials handling vehicles are operated.

In the following detailed description of the illustrated embodiments, reference is made to the accompanying drawings that form a part hereof, and in which is shown by way of illustration, and not by way of limitation, specific embodiments that may be practiced.

Moreover, unless otherwise stated specifically herein, any feature described herein, including such features described with regard to the above-described figures, can be combined in any combination that is not contradictory to operation. Thus, features that are described in successive paragraphs herein can be combined in any order as a specific implementation dictates.

DETAILED DESCRIPTION

Materials handling vehicles have various capabilities that exhibit maximum operational limits, such as a maximum travel speed, a maximum travel acceleration, a maximum brake deceleration, a maximum lift speed, a maximum lift height, a maximum load weight, etc. As an additional example, some materials handling vehicle capabilities may be enabled or disabled, such as blending, automation control, etc.

In some instances, the maximum operational limit of one or more capabilities may exceed what may be required or desired for certain applications, tasks, conditions, environments, operators, etc. As a further example, in some instances, it may be required or desired to selectively enable, disable, or modify a capability such as blending, an advanced automation capability, etc., for certain applications, tasks, conditions, environments, operators, etc. As such, aspects herein provide for "performance tuning" of a materials handling vehicle.

As used herein, performance tuning is the configuration or reconfiguration of: a materials handling vehicle, vehicle component(s), component(s) attached to or otherwise installed on the vehicle, combinations thereof, etc., to set or alter how a capability (or capabilities) of the materials handling vehicle respond. Solely by way of illustrative example, a performance tuning set out in greater detail herein may be used to set or otherwise limit a maximum travel speed of the materials handling vehicle. The maximum travel speed may be based upon an application (e.g., assigned to work on a loading dock), a task (e.g., moving a fragile load on the loading dock), a condition (e.g., busy first shift), an environment (e.g., location near an end of an aisle), an operator (e.g., skill, training, certification or other operator metric), other measure, combinations thereof, etc. As another non-limiting example, a pedestrian detection system attached to a materials handling vehicle can be configured using performance tuning as set out in greater detail herein, to modify a detection range based upon time of day, location, skill of the operator, current vehicle speed, etc.

In other example applications, performance settings for a collection of capabilities can be combined into a performance tuning profile that "tunes" the overall performance of the materials handling vehicle. This allows coordinated adjustments to ensure the vehicle is operating within manufacturer specifications, to ensure that the vehicle is optimally adjusted for the task, environment, operator, combination thereof, etc.

As yet another example, a data structure can be used to organize parameters, ranges, codes, commands, etc., associated with a controller, group of controllers, electronic module(s), e.g., based upon a desired function (such as speed, acceleration, braking, lift height, carry weight, etc.), to control operation thereof. This can be linked to a visual metaphor such as a graphical user interface that includes virtual sliders, virtual knobs, virtual encoders, virtual buttons, virtual switches, etc. for creating or adjusting performance profiles. In this regard, the graphical user interface for creating or adjusting performance profiles can be a web interface (e.g., used to program a set of performance tuning profiles for storage in a database associated with a remote server), an interface running on a display mounted or otherwise integrated with a materials handling vehicle, or a combination thereof.

For instance, solely by way of example, a first slider can be used to tune a maximum travel speed, which performance tunes a traction controller to operate the industrial vehicle according to a maximum speed determined by the first slider setting. A second slider can set a maximum acceleration, which may performance tune the traction controller to operate the industrial vehicle according to a maximum acceleration determined by the second slider setting. A third slider can select a maximum lift weight, which causes performance tuning of a hydraulic controller to operate the industrial vehicle lift capability (e.g., forks) according to a maximum weight determined by the third slider setting, etc.

Notably, such an approach provides a common graphical user interface that can be consistently deployed across a fleet of vehicles to program consistent results regardless of the underlying programming required by the installed vehicle control modules. In this regard, the performance tuning system translates user settings into the necessary vehicle adjustments. For instance, setting a maximum travel speed to 4 kilometers per hour may translate to setting specific values of one or more set points, adjusting one or more parameters, etc., that are potentially unique to the particular hardware (e.g., unique to a specific vehicle control module and/or materials handling vehicle). Such codes, parameters, setpoints, etc., are likely not known or understood by the end user. Thus, the system herein translates operational capabilities into actionable and specific programmable information.

Yet further, the specific values of parameters, set points, etc., may even depend upon a particular version of a particular controller. In other embodiments, the specific parameters, or values necessary to carry out the user-entered performance value may depend upon factors other than the controller itself. For instance, a traction controller, and battery characteristics may be considered together to derive the necessary changes responsive to a performance tuning adjustment. Thus, aspects herein can function as an applications programming interface (API) or bridge to convert/translate vehicle performance settings to low level electronic control module commands, settings, set points, etc., which are specific to the underlying hardware. This allows the end user to be agnostic to the specific implementation details, which can be based upon dynamic runtime computations.

Loading a performance tuning profile into a materials handling vehicle can be dynamic, e.g., based upon operational data collected by the materials handling vehicle, by a remote server, based upon geo-location, task information, operator information, other data that can be collected and electronically analyzed, combinations thereof, etc.

Moreover, aspects herein provide a vehicle display that provides performance tuning information, as will be described in greater detail herein. In some embodiments, the display can provide an output only, so that the user can visually observe one or more settings, but cannot change any of the settings. In some embodiments, one or more settings may be adjusted on the vehicle, e.g., using a touchscreen, keyboard, other input/output device, etc. In certain embodiments, only certain users can program a performance tuning, e.g., a service person, supervisor, etc. Regardless of whether performance tuning on the vehicle is output only or a user-adjustable configuration, in some embodiments, certain vehicle conditions must be met, e.g., the vehicle is stopped before performance tuning can be observed and/or adjusted.

In view of the above, disclosed herein is a materials handling vehicle control center that monitors materials handling vehicle usage. In some embodiments, the control center also provides feedback based upon the monitored information. For instance, feedback may be to the operator. Feedback may also be to a materials handling vehicle, e.g., to set or change a performance tuning of the materials handling vehicle, etc. Yet further, feedback may be to the enterprise, a manufacturer, or other remote entity. In some embodiments, tools are provided, e.g., in the form of a graphical user interface, that enables viewing performance settings, modifying performance settings, combinations thereof, etc.

System Overview

Referring now to the drawings and in particular to FIG. 1, a schematic diagram illustrates a materials handling vehicle system 100 according to various aspects of the present disclosure. The materials handling vehicle system 100 is a special purpose (particular) computing environment that includes a plurality of hardware-equipped processing devices 102 that are linked together by one or more network(s) 104.

The network 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more network configurations, examples of which include intranets, extranets, local area networks (LAN), wide area networks (WAN), wireless networks (WiFi), the Internet, including the world wide web, cellular and/or other arrangements for enabling communication between the processing devices 102, etc.

A processing device 102 can be implemented as a server, personal computer, laptop computer, netbook computer, tablet, purpose-driven appliance, special purpose computing device, personal data assistant (PDA) processor, palm computer, cellular device including cellular mobile telephone, smartphone, an information processing device on a vehicle, an information processing device on a machine (fixed or mobile), or other device capable of communicating over the network 104.

Particularly, a processing device 102 is provided on one or more materials handling vehicles 108. In the example configuration illustrated, a processing device 102 on a materials handling vehicle 108 wirelessly communicates through one or more access points 110 to a corresponding networking component 106, which serves as a connection to the network(s) 104. Alternatively, a materials handling vehicle 108 can be equipped with cellular or other suitable wireless technology that allows the processing device 102 on the materials handling vehicle 108 to communicate directly with a remote device (e.g., over the network(s) 104).

The system 100 also includes a processing device implemented as a server 112 (e.g., a web server, file server, and/or other processing device) that supports a platform 114 and corresponding data sources (collectively identified as data sources 116).

As will be described in greater detail here, materials handling vehicles 108 operating in a work environment such as a warehouse, distribution center, retail establishment, etc., can be equipped with one or more capabilities that require training and experience to use effectively. As such, the platform 114 provides materials handling vehicle monitoring, management, control, or combinations thereof, as described more fully herein, to wirelessly and dynamically carry out performance tuning of a fleet of materials handling vehicles.

In the illustrative example, the data sources 116, which need not be co-located, include databases that tie processes executing for the benefit of an enterprise, from multiple, different domains. In the illustrated example, data sources 116 include a materials handling vehicle information data source 118 that collects data from the operation of materials handling vehicles 108, e.g., in a materials handling vehicle domain. By way of example, the materials handling vehicle information database can store electronic vehicle records, e.g., received wirelessly, from a fleet of materials handling vehicles. In this regard, each electronic vehicle record can comprise travel-related, load handling related, and other vehicle generated data recorded by controllers, sensors, and other electronics on an associated materials handling vehicle being operated in a work environment by a corresponding operator. Each electronic vehicle record can also include an operator identification of the corresponding operator of the materials handling vehicle.

Additional data can include performance tuning profiles, performance tuning rule data, operator lists, checklist information, vehicle customization data, and other information useful by or generated by the corresponding fleet of materials handling vehicles. Here, vehicle data can be associated with vehicle operators.

Data sources 116 can also include a management system data source 120, e.g., a warehouse management system (WMS). The WMS relates information to the movement and tracking of goods within the work environment in a WMS domain. As such, in some embodiments, WMS data can be utilized to select, define, refine, etc., tasks, activities, etc., for the work environment. Also, WMS data can be used by the rules engine to assess whether to implement a performance tuning change. For instance, detecting that an operator is tasked to pick up a fragile load, enter a refrigerated area, or perform some other specific task, the rules engine can cause the operator's vehicle to performance tune to optimize the vehicle for that task.

Moreover, data sources 116 can include any other data source(s) 122 needed by the work environment, such as a labor management system (LMS), geo-location system, etc. The above list is not exhaustive and is intended to be illustrative only.

By way of introduction and summary, the platform 114 can support user interaction, e.g., via a web interface. Here, the user of the web interface can view dashboard data generated by the platform 114, and/or retrospect historical data collected into the data sources 116. In this regard, the platform 114 can pull data from any one or more of the data sources 116 to derive insights into operator performance, behavior, skill level, etc. For instance, by noticing that an operator has not had an impact, and has followed environmental rules over some time period (e.g., week, month, etc.), a user of the web interface can modify that vehicle operator's performance profile. The user of the web interface can also down tune the performance profile of an operator that has an unusually high number of impacts, has not followed environmental policies, etc.

In applications where automated performance tuning is carried out, the user of the web interface can, in some embodiments, program a rules engine running on the platform 114 to manage performance tuning. Here, the user can create/program as well as edit performance tuning profiles, which are stored in a central database (e.g., industrial vehicle data 118). The user interacting with the interface can then set rules based upon monitored data (e.g., data collected into any combination of data in the data sources 116) on when to apply the rules. Here, the rules that can be created are only limited by the ability of the platform 114 to obtain data necessary to interpret the rules. In some embodiments, the rules define triggering events for when to update performance tuning profiles. Here, triggering events can be based upon dynamically detected conditions, real-time conditions, computations, aggregations, intervals (e.g., time, occurrences, combinations thereof, etc.).

In this regard, in some embodiments, the platform 114 can monitor for real-time conditions, e.g., location, traffic congestion in an aisle or area of an environment, time of day, and other factors as set out herein. Moreover, the platform 114 can analyze and/or retrospect collected data. Still further, rules can be established to aggregate, assemble, analyze, create new data types, such as operator scores, operator ranks, and other data types that can be useful for setting triggers for updating performance profiles. Still further, thresholds, ranges, etc., can be defined to enable the rules engine to run automatically on the platform 114.

In some embodiments, a cadence is set, e.g., once a day, once a week, once a month, etc., where the system can assess or reassess performance profile settings. This can be advantageous, such as where dynamic changes are undesirable or not practical for a given application. Moreover, such periodic or otherwise interval assessment can be manually carried out or automated. Thus, performance tuning profile changes can be based upon real-time data, historical data, periodic or interval assessments, or a combination thereof.

In some embodiments, a graphical user interface can provide management level dashboard data, whereupon the platform 114 can execute a process that performs parsing of the collected materials handling vehicle records for each vehicle operator to extract dashboard data. Here, the dashboard data can include information related to the performance tuning of materials handling vehicles and/or information related to key indicators to assess whether to trigger changes to performance profiles for operators and/or materials handling vehicles, as set out in greater detail herein. For instance, navigable dashboards can allow a user to quickly assess operator performance to evaluate whether to adjust a performance profile for a vehicle operator.

In view of the above examples, FIG. 1 illustrates a system and enables a process for controlling the performance of a fleet of materials handling vehicles comprising a central database that stores electronic performance tuning profiles, and a remote processor that is coupled to memory (e.g., server computer 112 implementing the platform 114). Here, the remote processor is programmed by instructions in the memory that cause the remote processor to monitor activity of a fleet of materials handling vehicles 108 to detect triggering events, wherein, upon detecting a triggering event, the remote processor wirelessly transmits an electronic performance tuning profile selected from the electronic performance tuning profiles stored in the central database, to a corresponding materials handling vehicle in the fleet of materials handling vehicles.

Materials Handling Vehicle

Each materials handling vehicle 108 may comprise a forklift truck, reach truck, narrow aisle truck, order picker, stacker, pallet truck, tow tractor, any combination thereof, etc. In this regard, each materials handling vehicle 108 typically includes a load handling assembly that extends from a power unit.

The load handling assembly can include any combination of load handling features, such as a mast, forks, a load backrest, scissors-type elevating forks, outriggers or separate height adjustable forks, a load platform, a collection cage, combinations thereof, etc. The load handling assembly can also/alternatively include a hitch, tow couplers, other structures, or combinations thereof when the materials handling vehicle 108 is implemented as a tow tractor/tugger.

The power unit can include an operator's station for operator-driven materials handling vehicles. In these instances, the operator's station provides a location for the vehicle operator to access controls, features, and technology provided by the materials handling vehicle.

A hardware-equipped processing device 102 is positioned on the materials handling vehicle 108, e.g., within the power unit. In the context of deployment on a materials handling vehicle 108, the hardware equipped processing device 102 is also referred to herein as an information linking device 102. The information linking device 102 includes a processor, memory, vehicle network connection, transceiver to wirelessly communicate with remote server(s), e.g., via Wi-Fi, and other features, as will be described more fully herein.

Also, a display may be mounted to another suitable location at or near the power unit. The display provides a graphical user interface that enables an operator to interact with functions of the materials handling vehicle 108, interact with programming and data exchanges with the remote server 112 (FIG. 1) via the information linking device 102, combinations thereof, etc.

As will be described in greater detail herein, the corresponding materials handling vehicle 108 includes a control module (e.g., part of the information linking device/hardware processing device 102) having a processor that receives the wirelessly transmitted electronic performance tuning profile, and communicates at least one command across a vehicle network of the materials handling vehicle to modify performance of the materials handling vehicle according to a setting in the electronic performance tuning profile. Moreover, the display on the materials handling vehicle can be configured to output an indication that a performance tuning adjustment was made to the materials handing vehicle, e.g., based upon communication with the information linking device.

Control System

Figure 2:
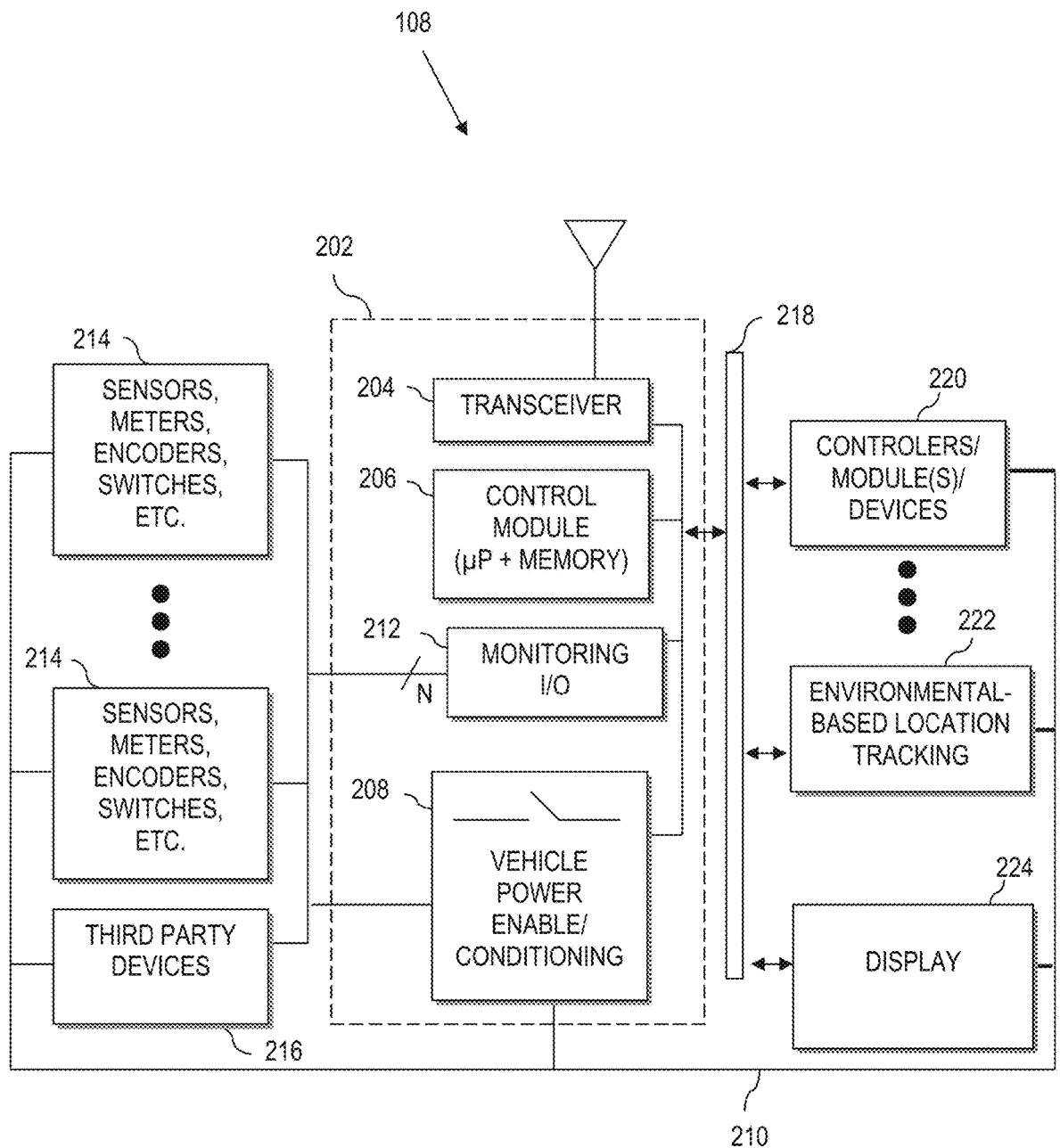
FIG. 2 is a schematic diagram of several components of a materials handling vehicle capable of remote wireless communication.

Referring to FIG. 2, a block diagram illustrates a control arrangement for one or more of the materials handling vehicles 108 of FIG. 1, which is implemented as an information linking device 202. The information linking device 202 can implement the information linking device 102 of FIG. 1.

The information linking device 202 comprises the necessary circuitry to implement wireless communication, data and information processing, and wired (and optionally wireless) communication to components of the materials handling vehicle 108, and with the server 112 (FIG. 1), such as via access points 110 (FIG. 1), cellular, etc.

The illustrated information linking device 202 includes a transceiver 204 for wireless communication. Although a single transceiver 204 is illustrated for convenience, in practice, one or more wireless communication technologies may be provided. For instance, the transceiver 204 communicates with a remote server, e.g., server 112 of FIG. 1, via 802.11.xx across the access points 110 of FIG. 1. The transceiver 204 may also optionally support other wireless communication, such as cellular, Bluetooth, infrared (IR), ultra-wide band (UWB), or any other technology or combination of technologies. For instance, using a cellular to IP bridge the transceiver 204 can use a cellular signal to communicate directly with a remote server, e.g., a manufacturer server across a network 104 (FIG. 1).

The information linking device 202 also comprises a control module 206, having a processor coupled to memory for implementing computer instructions, including computer-implemented processes, or aspects thereof, as set out and described more fully herein. For instance, the control module 206 utilizes the transceiver 204 to exchange information with the remote server 112 (FIG. 1) for controlling operation of the materials handling vehicle 108, for remotely storing information extracted from the materials handling vehicle 108, to carry out performance tuning as described more fully herein, etc.

The information linking device 202 further includes power enabling circuitry 208 controlled by the control module 206 to selectively enable or disable the materials handling vehicle 108 (or alternatively, to selectively enable or disable specific control modules or vehicle functions such as hydraulic, traction, etc.). For instance, the control module 206 can control the power enabling circuitry 208 to provide power to the materials handling vehicle 108, to provide power to select components of the materials handling vehicle 108, to provide power for select vehicle functions, etc., via power line 210, e.g., based upon operator login, detected geo-features, etc.

Still further, the information linking device 202 includes a monitoring input output (I/O) module 212 to communicate via wired or wireless connection to peripheral devices attached to or otherwise mounted on the materials handling vehicle 108, such as sensors, meters, encoders, switches, lights, etc. (collectively represented by reference numeral 214). The I/O module 212 may also be connected to other devices, e.g., third party devices 216 such as RFID scanners, displays, meters or other devices. This allows the control module 206 to obtain and process information monitored on the materials handling vehicle 108.

The information linking device 202 is coupled to and/or communicates with other industrial vehicle system components via a suitable vehicle network 218. The vehicle network 218 is any wired or wireless network, bus or other communications capability that allows electronic components of the materials handling vehicle 108 to communicate with each other. As an example, the vehicle network 218 may comprise a controller area network (CAN) bus, Local Interconnect Network (LIN), time-triggered data-bus protocol (TTP) or other suitable communication technology.

As will be described more fully herein, utilization of the vehicle network 218 enables seamless integration of the control module 206 and other components of the information linking device 202 into native electronics of the materials handling vehicle 108. In the example configuration, the control module 206 of the information linking device 202 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc. (collectively referred to by reference 220).

According to yet further aspects of the present disclosure, an optional environmental-based location tracking device 222 is provided on the materials handling vehicle 108. As illustrated, the environmental-based location tracking device 222 is connected to the vehicle electronics via the vehicle network 218 (e.g., via a CAN bus). As a result, the environmental-based location tracking device 222 can communicate directly with the control module 206, as well as other devices linked to the vehicle network 218 of the corresponding materials handling vehicle 108. The environmental-based location tracking device 222 enables the materials handling vehicle 108 to be spatially aware of its location within a dimensionally constrained environment, e.g., a mapped portion of an industrial enterprise.

A conventional technology such as a global positioning system (GPS) is not likely to be effective when the materials handling vehicle 108 is operated indoors. However, the environmental-based location tracking device 222 can comprise a local awareness system that utilizes markers, including fiducial markers, RFID, beacons, lights, other external devices, combinations thereof, etc., to allow spatial awareness within the industrial (e.g., warehouse, manufacturing plant, etc.) environment. Moreover, local awareness can be implemented by machine vision guidance systems, e.g., using one or more cameras. The environmental-based location tracking device 222 may also/alternatively use transponders and triangulation calculations to determine position.

Yet further, the environmental-based location tracking device 222 and/or other controller on the materials handling vehicle 108 (e.g., the processor within the control module 206) can use combinations of the above and/or other technologies to determine the current (real-time) position, or relative travel (e.g., position, distance traveled, orientation, etc.) of the materials handling vehicle 108. As such, the position (or at least the travel distance) of the materials handling vehicle 108 can be continuously ascertained (e.g., every second or less) in certain implementations. For instance, knowledge read from inertial sensors, vehicle sensors, encoders, accelerometers, gyroscopes, etc., (e.g., via the controllers 220 across the vehicle network 218, via sensors 214 and/or third-party devices 216 across the monitoring I/O 212 and vehicle network 218, etc.) can be utilized to determine the position, direction, orientation, travel distance, etc., of the materials handling vehicle 108 within the industrial enterprise and/or to augment or modify the position determination from the location tracking device 222.

Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The environmental-based location tracking device 222 is aware of the absolute position of the materials handling vehicle 108 within a dimensionally limited environment, e.g., a mapped portion of an industrial enterprise. By "absolute" position, it is meant that the vehicle position is known relative to a map. The map may be a regional area, e.g., only a portion of an indoor facility such as a warehouse. Absolute position is to be differentiated from relative offset position. A relative offset position can be a general description of an offset distance, e.g., two meters away, without also knowing the direction of the offset. Alternatively, the relative offset position can be a general description of a direction without a distance, e.g., towards the power unit of the materials handling vehicle 108, without knowing the precise distance. In other examples, the relative offset position can be a precise measure of both offset and direction, two meters away in direction X, Y, Z. In this situation, orientation or a standardized reference plane should be established to ensure that offset position is accurately translated to absolute position, and vice-versa. In certain illustrative implementations, the absolute position of the materials handling vehicle 108 may be known, but orientation may be unknown. In other implementations, orientation and absolute position are known.

The control module 206 also communicates with a vehicle display 224, e.g., a touchscreen, display screen, etc. The display 224 is typically mounted in the operator's compartment and provides widgets and other display information, examples of which are set out in U.S. Pat. No. 10,430,073, having the title "Processing Device Having a Graphical User Interface For Industrial Vehicle", the disclosure of which is incorporated by reference in its entirety.

The information linking device 102 can carry out data collection, checklists, and other capabilities described with reference to the information linking device 38 as set out in U.S. Pat. No. 8,060,400, having the title "Fleet Management System", the disclosure of which is incorporated by reference in its entirety.

Performance Tuning

As noted more fully herein, performance tuning is the configuration or reconfiguration of a materials handling vehicle to set or alter how a capability (or capabilities) of the materials handling vehicle respond. With reference to FIG. 1 and FIG. 2 generally, a "performance tuning profile" can be stored remotely, e.g., within a database in the industrial vehicle data 118 coupled to the remote server 112 (FIG. 1). Alternatively, performance tuning profiles can be stored on the materials handling vehicle locally.

By way of example, when an operator logs into the materials handling vehicle, the control module 206 (FIG. 2) can wirelessly communicate via the transceiver 204 (FIG. 2), an operator identification, materials handling vehicle identification, other information, combinations thereof, etc., to the platform 114 (FIG. 1). Responsive to receiving the login information, the platform 114 (FIG. 1) returns to the control module 206 (FIG. 2), a performance tuning profile. The specific performance tuning profile can be automatically selected by a rules engine running on the platform 114, or the performance tuning profile may have been pre-selected by a manager or supervisor. Regardless, the specific performance tuning profile may be selected based upon the enterprise, vehicle, vehicle type, operator identification, combinations thereof, etc. Moreover, more than one performance tuning profile can be loaded into the vehicle. Here, a processor of the vehicle (e.g., control module 206—FIG. 2), can manage loading, storing, and otherwise processing the performance tuning profile(s) received from the remote server.

By way of illustration, the control module 206 can process the received performance tuning profile by communicating across the vehicle network 218 to controllers 220, sensors, 214, etc., to set, modify, adjust, i.e., "tune" the performance of the materials handling vehicle. For instance, the maximum operating speed can be set, limited, adjusted, etc., by changing a setpoint, control parameter, or other suitable configuration variable in a traction control module 220 of the materials handling vehicle. Maximum lift height, lift speed, etc., can be modified by communicating, e.g., across the vehicle network 218, new setpoints, parameter values, or other appropriate configuration variables to a hydraulic controller 220, etc. In some embodiments, the maximum value is limited by an absolute maximum value set for instance, by a manufacturer or service center.

Performance tuning need not be limited to the time of operator login. Rather, performance tuning can be carried out in whole or in part, at any suitable time, including at times during operation of the materials handling vehicle. Moreover, there may be multiple performance tuning profiles, e.g., for the vehicle, operator, application, task, environment, geolocation, other basis, combinations thereof, etc.

In this regard, an application running a rules engine on the platform 114 can evaluate information in the data sources 116, e.g., collected operational data from materials handling vehicles, evaluate WMS data, evaluate LMS data, evaluate geo-data, and/or other related data to detect the triggering of events, e.g., a materials handling vehicle engaged in an activity, task, environment, condition, etc. Upon detecting triggering events, the platform 114 wirelessly communicates appropriately selected performance tuning profile(s) to the associated materials handling vehicle.

In an example embodiment, performance tuning can include a vehicle performance profile that includes general vehicle profile settings, e.g., default vehicle performance parameters.

In some embodiments, performance tuning can also/alternatively include operator-specific performance settings. Here, operator performance settings can be divided into those vehicle performance settings that the operator cannot view and/or adjust, and those vehicle performance settings that the operator can view and/or adjust.

For instance, a display of the materials handling vehicle may include one or more widgets that allow the vehicle operator to tune or adjust the performance of the materials handling vehicle.

Referring briefly to FIG. 3A-FIG. 3D, a vehicle display 300 (e.g., implementing display 224 (FIG. 2)), illustrates example widgets. The vehicle operator can interact with these displayed widgets to view and in some embodiments, adjust a performance tuning of the materials handling vehicle.

Figure 3A:
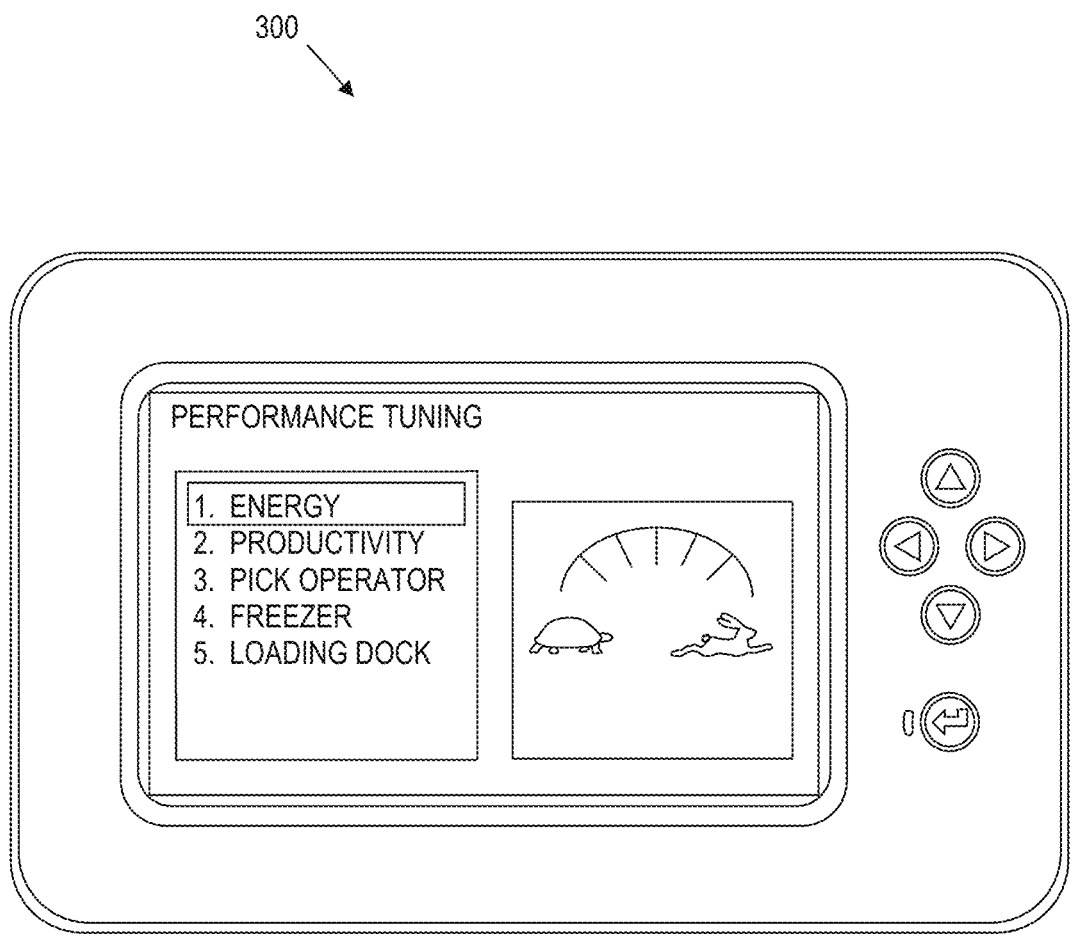
FIG. 3A is a schematic illustration of a display mounted on a materials handling vehicle, where a graphical user interface presents a dashboard that displays materials handling vehicle performance tuning.

For instance, in the example embodiment of FIG. 3A, the operator selects from among a set of available performance tuning profiles (e.g., associated with the operator and/or materials handling vehicle) in a first widget. For instance, as illustrated, performance tuning profiles are available that focus on: 1 energy usage; 2 productivity; 3 tasks as a pick operator; 4 operations in a freezer; and 5 operations on a loading dock. FIG. 3A also illustrates a "throttle" in a second widget, e.g., analogous to a conventional "rabbit/turtle" throttle control. In some embodiments where no operator control is provided, the widget can show a current setting. In an embodiment where the vehicle operator has control, the operator can adjust the throttle. Adjusting the throttle can modify one or more parameters so that the vehicle operator-selected widget performs in an orchestrated manner. The above is purely for illustration and not limiting to the types of widgets and display information that can be presented.

User interaction can be carried out using gesture commands or otherwise interacting with a touchscreen, interacting with physical or virtual controls, combinations thereof, etc.

In some embodiments, the operator may have only a limited number of performance capabilities that can be adjusted. In other embodiments, the operator can see a number of capabilities, and can adjust them down, but not up past the maximum for that performance tuning. In yet other examples, an operator can access a widget to select one of a range of performance tuning profiles, e.g., an energy conserving profile (e.g., to finish a shift with a low battery), a "normal" performance tuning profile, etc.

As still another example, one or more performance profiles can be set for other factors, such as environmental conditions (e.g., a "wet floor" performance profile, first shift performance profile), operating conditions (e.g., a load weight performance profile, lift height performance profile, energy conservation performance profile, etc.) an activity (e.g., a put-away performance profile, a loading dock performance profile, a freezer section performance profile, etc.), a task (fragile load performance profile, a bonded area performance profile, etc.), a geofeature-based condition (e.g., end of aisle performance profile), an operator skill performance profile, etc.

In some embodiments, there are different layers of adjustability, depending upon role. For instance, an operator may be able to control certain aspects of performance tuning, but a supervisor may be able to define greater details of performance tuning. The performance tuning profiles can be stored, for instance, in a library (e.g., in the industrial vehicle data 118 (FIG. 1).

In some embodiments, e.g., where multiple performance tuning profiles are loaded, rules are implemented to control conflicts, e.g., by setting that capability to the most restrictive, etc.

In some embodiments, the performance tuning profiles can comprise a mix of manufacturer provided profiles and enterprise created profiles. Regardless, a supervisor can set up the profiles, e.g., via a graphical user interface on a computer such as a tablet, laptop, desktop, etc., in data communication with the remote server 112 (FIG. 1). The remote server 112 (FIG. 1) pushes the appropriate performance profile to the associated materials handling vehicle 108 to be modified by the vehicle's corresponding control module 206, e.g., based upon a rules engine that detects triggering events that are pre-programmed, as described more fully herein.

As noted more fully herein, example parameters that can be "tuned" in the materials handling vehicle can include maximum travel speed, acceleration rate, lift speed, lift height, lift acceleration, lift deceleration, load weight, brake rate, steer capability, blending enabled/disabled, automation enabled/disabled, etc.

The performance tuning can also affect communication systems on the materials handling vehicle. For instance, a light on the materials handling vehicle can indicate to pedestrians near the materials handling vehicle, the identity, skill, or other parameters associated with the vehicle operator, performance tuning settings, a loaded performance tuning profile, etc. Such an approach can also be used itself for local communication. For instance, a worker in the vicinity of the materials handling vehicle can visually observe a light, light color, display message, etc., and know the performance tune of the materials handling vehicle. For instance, if an energy/low battery performance profile is loaded, a pedestrian knows that the vehicle battery is low, and this can trigger workflows, actions, change tasks, etc.

In some embodiments, the user-selected performance profile is communicated back to the server (e.g., server 112—FIG. 1). This can also trigger workflows. For instance, a user changing a performance tune profile to energy conservation may trigger a battery charge routine to reserve a time for a battery charge operation/battery swap. As another example, a warehouse management system or other automated process can re-assign tasks based upon the updated performance tune setting, to account for the adjusted vehicle capability.

Each performance tuning profile need not tune every tunable parameter. For instance, rules can be set up for a single performance tuning parameter, e.g., maximum speed. In other embodiments, other parameters or combinations of parameters can be performance tuned.

As a working example, a particular materials handling vehicle type may have a manufacturer performance profile that sets the maximum vehicle travel speed, e.g., 9 miles per hour (about 14.5 kilometers per hour). This sets the absolute maximum that the materials handling vehicle speed can be set in a performance tuning profile. An enterprise however, may have a "company profile" that sets the maximum speed at 7 miles per hour (approximately 11.3 kilometers per hour). This can set the maximum speed within the enterprise. The remote server 112 (FIG. 1) can wirelessly communicate this "company profile" to every affected materials handling vehicle in the corresponding fleet. This top speed can be lowered by additional, specific profiles that can be loaded due to operator, activity, task, environment, etc., as noted in greater detail herein.

In some embodiments, an operator performance tuning profile defines maximum limits for an operator, e.g., based upon skill. For example, an enterprise may set a first overall maximum travel speed, but a novice operator may have a performance tuning that sets the maximum travel speed to a speed that is less than the maximum. Thus, the novice profile tunes down performance even further, etc.

In further embodiments, an operator may have multiple skill ratings. For instance, an operator may be an expert when operating a sit-down counterbalance truck, but an intermediate operator when operating a turret stock picker. The difference in rating may also and/or alternatively be based upon other factors, e.g., environmental conditions, tasks, etc. For instance, an operator may be an expert at working in a freezer area, but a beginner working on a loading dock. The operator may be an expert in pick aisles of a warehouse, but only an intermediate operator in busy areas such as receiving lanes, etc.

Given the above, the system herein can monitor operation of the materials handling vehicle and adjust the performance profile accordingly—e.g., automatically based upon task, environment, vehicle type, operator, assessed operator skill level, combinations thereof, etc. In other embodiments, the vehicle operator can control the performance tuning. In still yet further embodiments, the vehicle operator can adjust performance tuning up or down, but no more than the limits set by the default or enterprise adjusted performance tuning settings.

In some embodiments, the performance tuning profile can be changed based upon a triggering event, such as by the operator and/or changed automatically by the system. For instance, a triggering event can be defined by detecting that the materials handling vehicle engaged in a new application (e.g., a new work assignment, a new technique or process, etc.). A triggering event can also be defined by detecting that the materials handling vehicle engaged in a new task. A triggering event can also be defined by detecting that the materials handling vehicle encountered a new operating condition (e.g., speed zone, narrow aisle, need to pass another vehicle, end of aisle, encountered an intersection, detected a battery charge below a preset threshold, detected a load exceeding a predetermined load weight, etc.). A triggering event can further be defined by detecting that the materials handling vehicle encountered a new environmental condition (e.g., wet floor, congested aisle, particular shift or time, etc.). Yet further, a triggering event can be defined by detecting that an operator logged onto the materials handling vehicle.

Figure 3B:
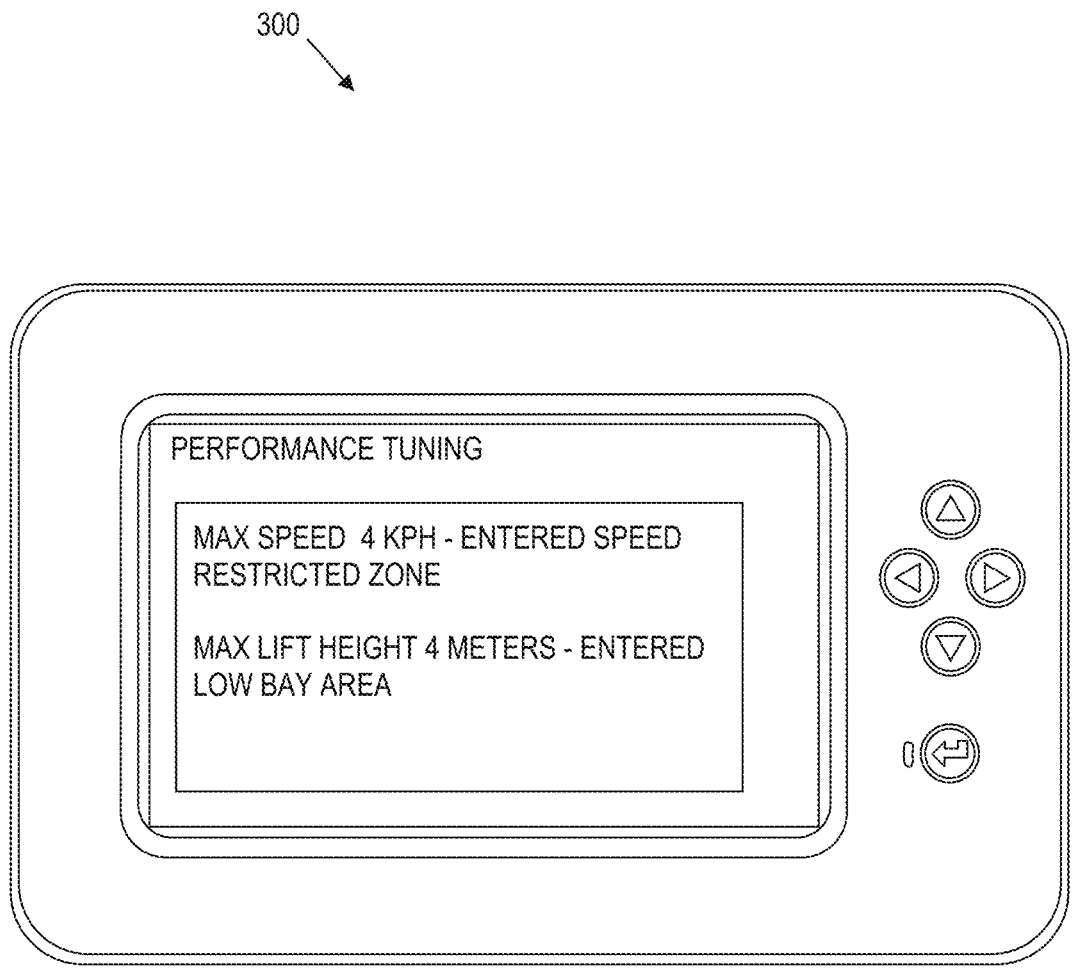
FIG. 3B is a schematic illustration of a display mounted on a materials handling vehicle, where a graphical user interface presents a materials handling vehicle performance tuning widget that illustrates performance tuning parameters and attributions.

Referring to FIG. 3B, a display 300 on a materials handling vehicle outputs an indication of the performance tuning settings. The display 300 can also include an attribution that shows the vehicle operator at least one factor that drove the performance tuning change. For instance, as illustrated herein, a widget on a display 300 on a materials handling vehicle can include attributions that show the basis for the current state of the performance tuning. For instance, in the non-limiting example, the widget shows that the vehicle is speed restricted because the operator entered a speed restricted zone within a facility. Also, the operator entered a low bay area, and as such, the lift height is restricted.

Figure 3C:
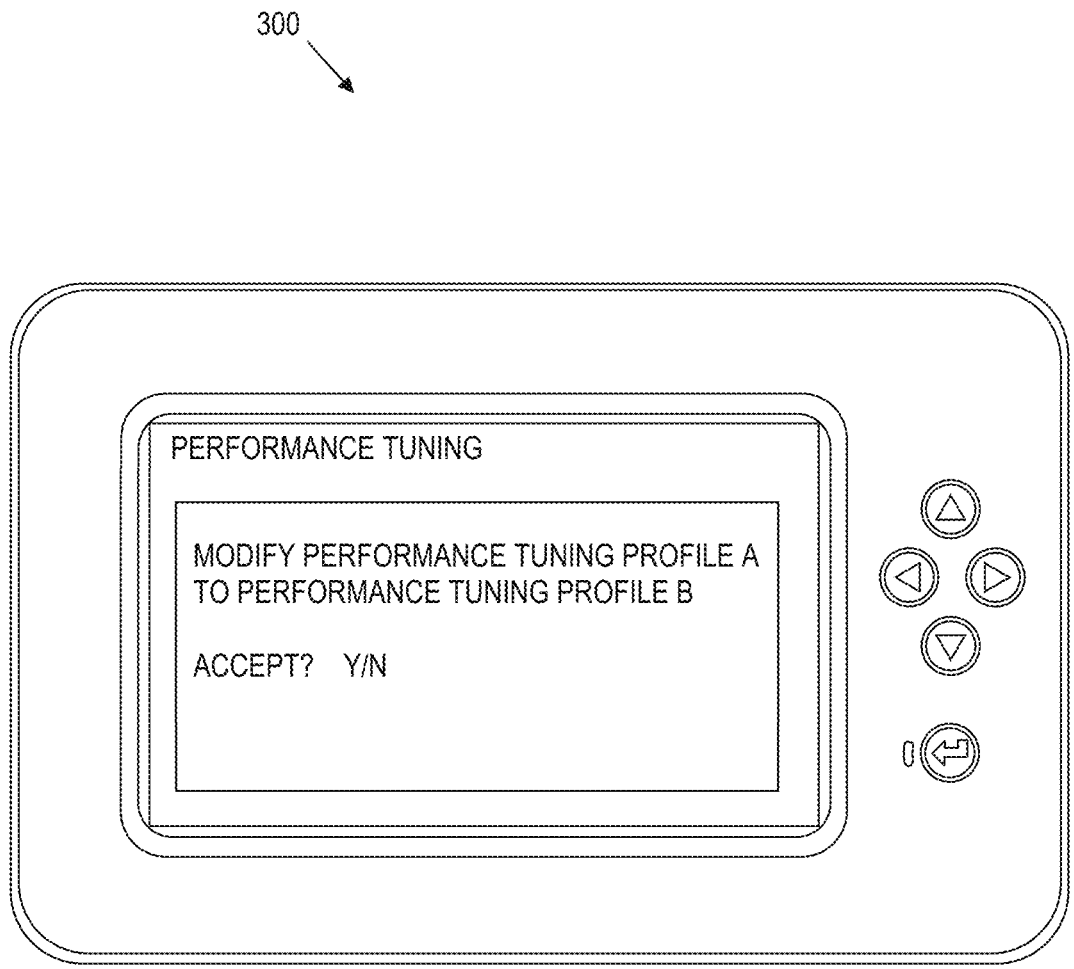
FIG. 3C is a schematic illustration of a display mounted on a materials handling vehicle, where a graphical user interface presents a materials handling vehicle performance tuning widget that shows a server request to change a performance tuning profile, requesting operator input to accept the changes.

Referring to FIG. 3C, a graphical user interface running on the display 300 on the materials handling vehicle can prompt a vehicle operator to accept or decline a newly received performance tuning profile. For instance, as illustrated herein, as illustrated herein, a widget on a display 300 on a materials handling vehicle can prompt the vehicle operator to accept a new performance tuning profile before the new performance tuning profile is loaded by the control module on the materials handling vehicle.

In some embodiments, the display 300 outputs a message to the vehicle operator indicating that the control module has received a new performance tuning profile from the remote source, where the display 300 provides an input for the operator to accept or reject the new performance tuning profile. Upon receiving the vehicle operator's input, the system communicates an acknowledgement back to the remote server. The acknowledgement is stored in a data source that stores data associated with the vehicle operator, e.g., the industrial vehicle data 118 (FIG. 1).

Figure 3D:
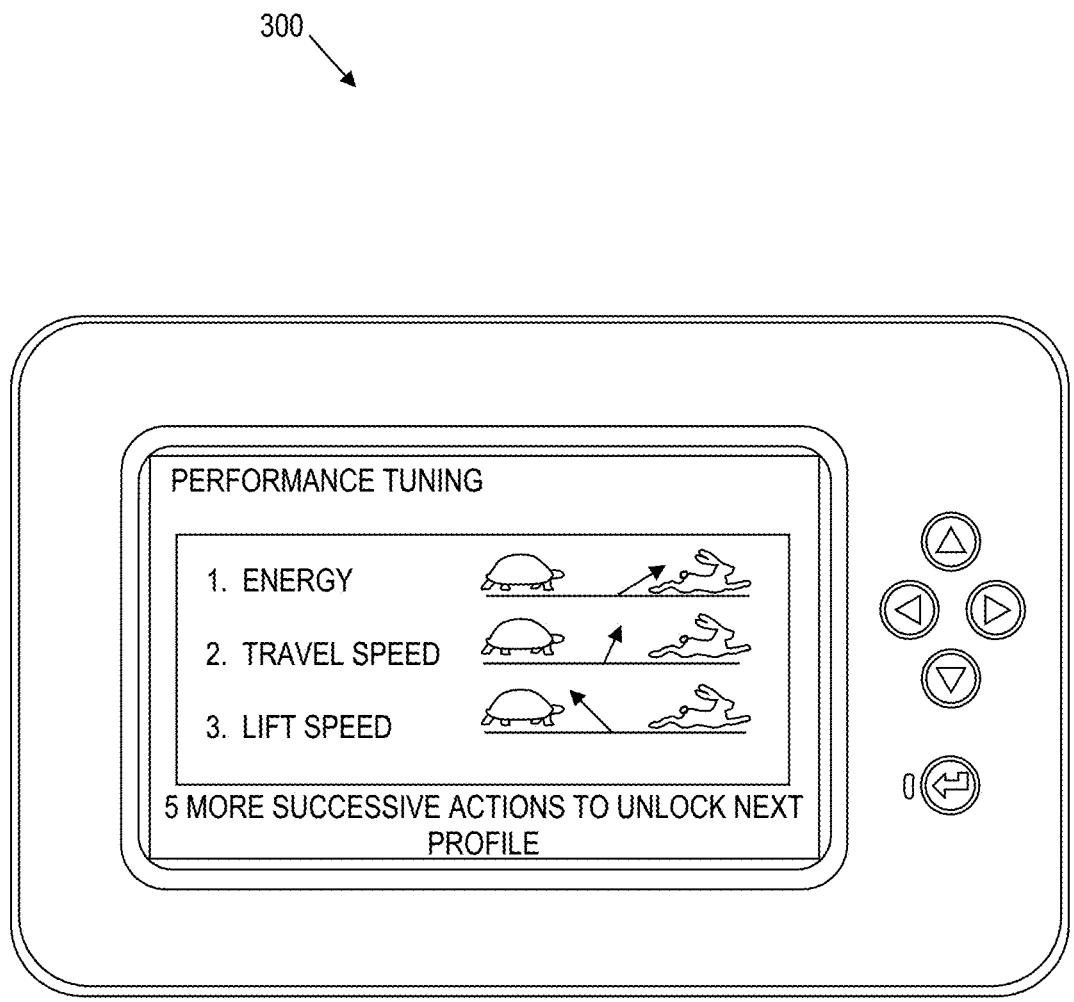
FIG. 3D is a schematic illustration of a display mounted on a materials handling vehicle, where a graphical user interface presents a materials handling vehicle performance tuning widget that enables a vehicle operator to make changes to a current performance tuning profile installed on a materials handling vehicle.

Referring to FIG. 3D, a display 300 on the materials handling vehicle outputs a graphical view of the current performance tuning profile, and allows a vehicle operator to interact with the graphical view to inspect and/or change the performance tuning on the vehicle. For instance, in the illustrated example, a widget shows example parameters that can be performance tuned, e.g., energy, travel speed and lift speed, which are illustrated solely by way of example. In some embodiments, example modified/modifiable settings of the materials handling vehicle can comprise at least one of: maximum speed; maximum acceleration; maximum braking; maximum lift height; maximum lift speed; maximum lift acceleration; maximum lift deceleration; maximum load weight; use of blending; or use of an automation feature of the materials handling vehicle; other parameters, etc.

Moreover, the current setting is visually displayed. In some embodiments, the vehicle operator can interact with an input, e.g., buttons, gesture commands on a touch screen, etc., to modify the settings. In some embodiments, the vehicle operator can adjust down one or more performance settings, and cannot adjust up any displayed performance settings, e.g., beyond a maximum value set by the currently loaded performance tuning profile. Notably, the maximum permitted by the currently loaded performance tuning profile may be less than the absolute maximum value enabled by the manufacturer.

FIG. 3D also illustrates an example where the display 300 outputs an affirmation to the vehicle operator related to a performance tuning profile setting. For instance, the example affirmation reminds the operator that five more successful actions (e.g., stop and sound horn at intersection) will unlock a next higher/better performance tuning profile. The affirmations can also be positive reinforcements, negative reinforcements, general messages, instructions, etc.

Managing Performance Profiles

It may be cumbersome for a remote user, such as a web user (supervisor, manager, etc.), to evaluate each operator's various performance profile(s), even when using the convenience of a web browser and graphical user interface. For instance, it can be cumbersome for a supervisor to evaluate a specific vehicle operator's quantifiable performance information against unique criteria of a particular operating environment to make decisions with regard to promoting/demoting a vehicle operator's current performance level, eliminating a vehicle operator's access to operate a specific type of equipment, granting new access to operate a specific type of equipment, etc. Additionally, it may be difficult for an operator to know and understand what performance profile is in effect and that is controlling/limiting various capabilities of an associated materials handling vehicle.

Similarly, even in an automated system, it can be cumbersome for a remote user, such as the web user, to establish rules for an automated rules engine to quantify performance information and/or to establish rules/conditions for promoting/demoting a vehicle operator's performance level, eliminating a vehicle operator's access to operate a specific type of equipment, or granting new access to operate a specific type of equipment. Yet further, there are instances where a vehicle operator may want to modify a vehicle's operating capability, e.g., when carrying a fragile load, when on a loading dock, when in a congested or narrow aisle, etc.

However, according to aspects of the present disclosure, a supervisor, manager, or other designated individual can access pertinent information about an operator's historic performance relative to the associated enterprise performance criteria in a manner that is graphically presented to the user via a web-based user interface. For instance, a platform (e.g., platform 114—FIG. 1) executing on a server computer, cloud computer, etc., can access collected industrial vehicle data, as well as other data collected and/or generated by an environment. Based on this (or other relevant) information, the web user can initiate desired changes in the performance tuning level settings associated with a specific operator. In some instances, the designated individual can also adjust whether the operator can access specific vehicles or specific features on a given materials handling vehicle.

In other embodiments, a rules engine can be set up to retrospect the vehicle operator's historic performance relative to predetermined performance criteria. Here, the rules engine can also include rules to trigger changes in the performance tuning settings associated with a specific operator and/or adjust whether the operator can access specific assets.

In some embodiments, performance tuning can be used to set vehicle capabilities, restrict or reduce vehicle capabilities, etc. Moreover, performance tuning can be carried out on a vehicle basis, vehicle type basis, environment of use basis, or other factors, examples of which are set out in greater detail herein. Also, tuning can be ad-hoc (i.e., customized for the individual). In yet some embodiments, to manage performance settings, one or more capabilities are established as a set of performance tuning levels. Here, each performance tuning level sets a manageable number of performance tuning settings with predictable and consistent steps/changes in vehicle capability. Thus, every operator at the same performance tuning level has the same set of capabilities/restrictions. That is, the performance tuning level dictates one or more operational capabilities (e.g., the maximum speed in which the vehicle is used by the specific vehicle operator, and in some cases, all vehicles of that respective equipment type will travel). However, other, more complex variations are possible, examples of which are set out in greater detail herein.

In yet other embodiments, performance tuning can be stored as a set of performance tuning profiles. Performance tuning profiles differ from performance levels in that a profile can be established for any one or more factors that can be dynamic and can include operator skill level, characteristics of a specific vehicle, vehicle type, vehicle conditions (e.g., battery state), vehicle data (e.g., load, sensor data, etc.), environmental conditions, location, time/date, etc. This allows performance changes to be more dynamic and fluid during operation of a materials handling vehicle. In this regard, all changes need not be drastic. Rather, subtle changes can be used to good effect to improve performance of a materials handling vehicle under a specific set of conditions, e.g., to improve handling, preserve battery life, to address load or environment, etc. In this regard, a performance tuning "level" is considered a subset of a performance tuning "profile", and thus reference to performance tuning profile includes performance tuning level.

In some embodiments, a graphical user interface enables a user to program a library of performance tuning profiles. Moreover, in some embodiments, a graphical user interface provides an interface to set up, configure, and program a rules engine that, when implemented, monitors events triggered during operation of a fleet of materials handling vehicles, and based upon a triggering event, wirelessly conveys from a remote source, a performance tuning profile to a corresponding materials handling vehicle.

Moreover, in some embodiments, a display on a materials handling vehicle enables an operator to interact with a currently active performance tuning, become aware of the performance tuning, receive information concerning the performance tuning, select a performance tuning, accept or reject a new performance tuning communicated to the materials handling vehicle by a remote server, or combinations thereof.

For instance, a vehicle operator may receive feedback on their performance relative to a currently programmed performance tuning or new performance tuning change. In some embodiments, when a change is made, a message regarding the proposed change in performance tuning level will be seen by the specific operator whose performance tuning level is subject to change, e.g., via the message communicated to the materials handling vehicle for presentation on the vehicle display. For instance, when an operator logs onto a materials handling vehicle, an information linking device on the vehicle can wirelessly receive the message from a server computer. The information linking device can then forward the message to a display on the vehicle so that the operator can review the message. In some embodiments, the message identifies the changes, requires a confirmation or acknowledgement, or combinations thereof.

In some embodiments, the operator may accept or reject (if permitted by the enterprise) the proposed change. In some embodiments, changes can only be implemented when certain criteria are met, e.g., the next time an operator logs into a vehicle, when the vehicle is stopped, etc. In some embodiments, the remote server system (platform) will retain the operator's election regarding such performance tuning change. As an alternative, some environments may elect to implement the change without the vehicle operator's consent.

In some embodiments, the display on the materials handling vehicle outputs a message, e.g., via a graphical representation, message, color code, etc., to designate the performance tuning active at the time. Such messages may be designed to encourage positive operator behavior. As another example, messages can inform the operator of progress towards unlocking or otherwise satisfying the rule/requirement for a next performance level change.

Aspects herein also bring about efficiency of the supervisor/manager to evaluate pertinent information based on established performance criteria (which may be from the manufacturer, custom defined by the enterprise, from a library, combinations thereof, etc.). Aspects herein further bring about efficiency in making changes in performance tuning level, enable/disable features, vehicle access, etc. In some embodiments, regardless of the basis for the change (e.g., environment, task, vehicle, activity, etc.) the performance tuning status is communicated to the operator on the display of the materials handling vehicle. In some instances, the system communicates a change in performance tuning level to the operator before the change goes into effect, and may provide the ability for the operator to acknowledge, accept/reject, modify, recommend back to the server alternative modification of, etc., such change.

In some embodiments, the disclosed system provides an ability to view operator performance-related information, filtered by an environment's unique performance criteria, and enable the changes efficiently through a website. Moreover, in some embodiments, the operator becomes aware of the performance setting change, and may be required to acknowledge (or accept/decline) such change before the change goes into effect. In other embodiments, the vehicle operator becomes aware of, but cannot alter, the performance tuning. Aspects further provide an ability to provide messages to the operator regarding their performance, e.g., so that the operator receives attributions leading to the change, knows their progress towards a change, understands the metrics that trigger the change, combinations thereof, etc.

In yet further embodiments, the performance tuning information provided on the display of the materials handling vehicle presents attributions designating a reason for the performance tuning change, e.g., "maximum speed" reduced to 3 miles per hour (approximately 4.8 kilometers per hour) because the vehicle is approaching an end of an aisle with a warehouse stop restriction. In some embodiments, the display provides motivating messages to the operator regarding their performance. For instance, the display outputs a message such as "maximum speed" set to 3 miles per hour (approximately 4.8 kilometers per hour) because you are in a pick aisle and have a beginner status in this environment—demonstrate correct behavior three more times and performance tuning will increase maximum speed to 5 miles per hour (approximately 8 kilometers per hour).

According to further aspects herein, the performance level tuning feature allows a user, e.g., interacting with the remote server (server 112—FIG. 1) to efficiently understand a vehicle operator's performance relative to an enterprise criteria, and recommend/implement changes through the software that control performance of the fleet of materials handling vehicles.

In addition, at the vehicle interface, the vehicle display notifies the operator of any changes in the vehicle performance settings (such as maximum speed) prior to the change going into effect, and may provide the ability for the operator to accept or deny the performance level change. Also, the display can selectively output performance inspiring messages, attribution messages, and other messages, e.g., based upon the specific operator's behavior relative to the performance custom criteria, or "rules" established by the enterprise.

Example

By way of illustration, and not by way of limitation, operators can be rated on a scale of five (5) categories, e.g., trainee, beginner, intermediate, advanced, and expert. Of course, other levels can be used, e.g., a scale of 1-10, a score of up to 100%, etc. In this regard, an evaluation can be performed based upon historical vehicle data associated with the operator. A manager or supervisor interacting with the industrial vehicle data 118 (FIG. 1) can see historical data in the form of dashboards, that allow an assessment of an operator across various metrics, e.g., tasks, vehicles, environmental situations, behavior/operational policy rules, etc. From this data, an operator can be assigned performance tuning profiles, even down to the granularity of a task-by-task basis. As an example, an operator may be assigned a performance tuning associated with an "expert" at conserving energy, but an "intermediate" at productivity, a performance tuning setting a maximum speed during third shift that is greater than a maximum speed during first shift, etc.

Once a set of performance tuning profiles are created, a rules engine is programmed to identify events, triggering conditions, and corresponding performance tuning profiles to wirelessly communicate to the triggering materials handling vehicle.

Server-Side Graphical User Interface

Figure 4:
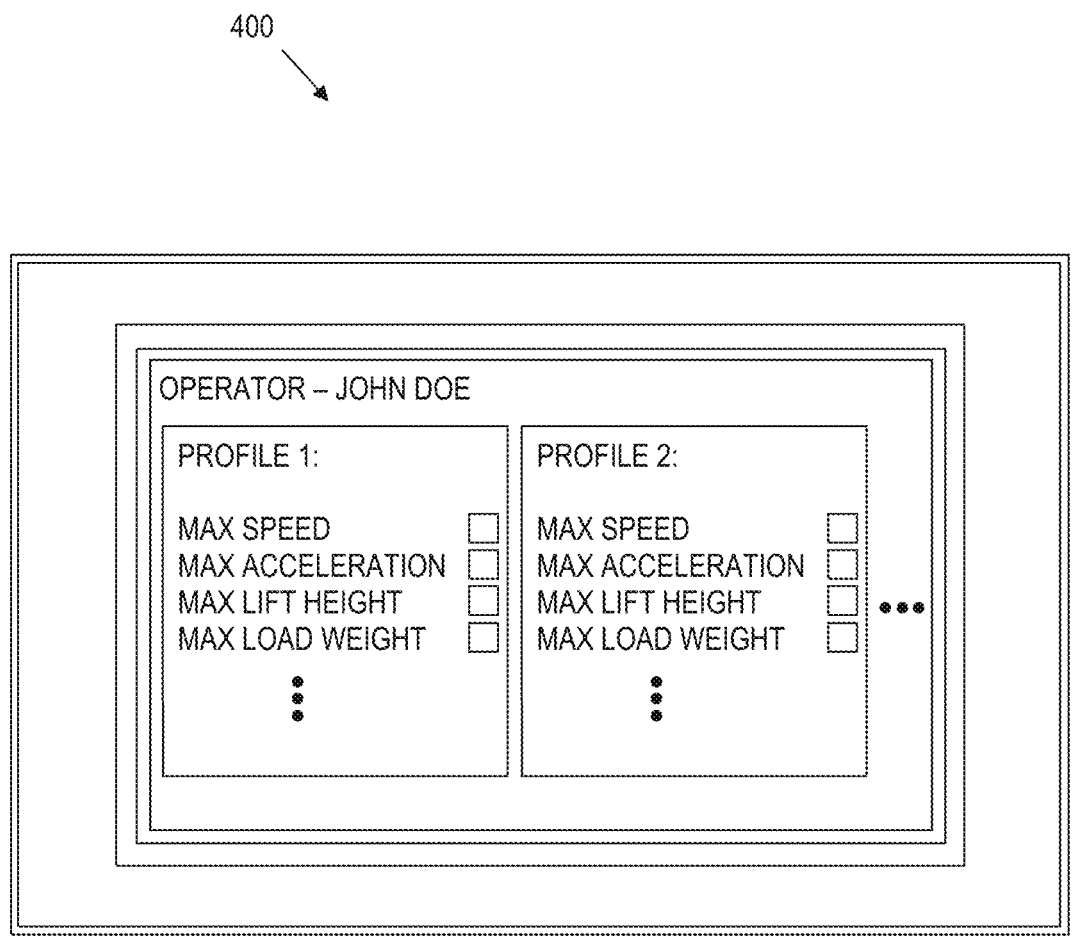
FIG. 4 is a schematic illustration of a display, e.g., which is coupled to a desktop, server, laptop, tablet, etc., where a graphical user interface presents a dashboard and/or interface that displays materials handling vehicle performance tuning options and allows a user to define performance tuning profiles, rules for when to apply the performance tuning profiles, perform functions and features as set out in greater detail herein.

Referring to FIG. 4, an example computing device, e.g., a tablet, illustrates a supervisor logged into the platform 114 (FIG. 1) to program performance tuning profiles for operators, vehicles, tasks, activities, geo-locations, etc. In this regard, the supervisor can set up rules that affect when the various performance tuning profiles are read out and processed, e.g., based upon geo-location/location tracking, task assignment (e.g., as determined from logged materials handling vehicle data logging, as read from a warehouse management system, etc.). The user can interact with a graphical user interface to fill in values, define simple to complex rules for when to apply or change a performance profile, etc.

By way of illustration, as shown, each profile contains a set of performance variables, such as max speed, max acceleration, max lift height, max load weight, etc. A user interacting with the graphical user interface selects one or more of the performance variables, and can enter a specific value in to the prompt, then save the performance profile as a preset. Once created, presets can be shared, copied, tweaked, saved, etc. The platform 114 then takes control to map profile performance variables to the necessary control codes associated with the vehicle that an operator has logged into.

Thus, in an example implementation, when a vehicle operator logs onto a materials handling vehicle, the platform searches for the operator and matches the operator to the vehicle (or vehicle type) that the operator has logged onto. The platform then extracts therefrom, one or more performance tuning profiles. In some embodiments, the platform 114 takes responsibility for mapping the variables to necessary to implement the changes in the controllers of the associated vehicle. In other embodiments, a counterpart application is hosted on each materials handling vehicle such that the translation of the variables into machine control is carried out at the vehicle itself.

The performance level tuning feature herein thus allows a web user (e.g., supervisor) to efficiently understand a vehicle operator's performance relative to criteria established by an environment, and recommend/implement changes through software that control vehicle capabilities, and in some embodiments, whether the operator may continue to have access to a piece of equipment.

As noted more fully herein, ion addition, aspects herein can provide a feature to notify the operator of any changes in the vehicle's performance settings (such as maximum speed) prior to the change going into effect, and provides the ability for the operator to accept or deny the performance level change. Finally, the feature may include performance inspiring messaging on the module associated with the specific operator's behavior relative to the performance custom criteria, or "rules" established by the customer.

Figure 5:
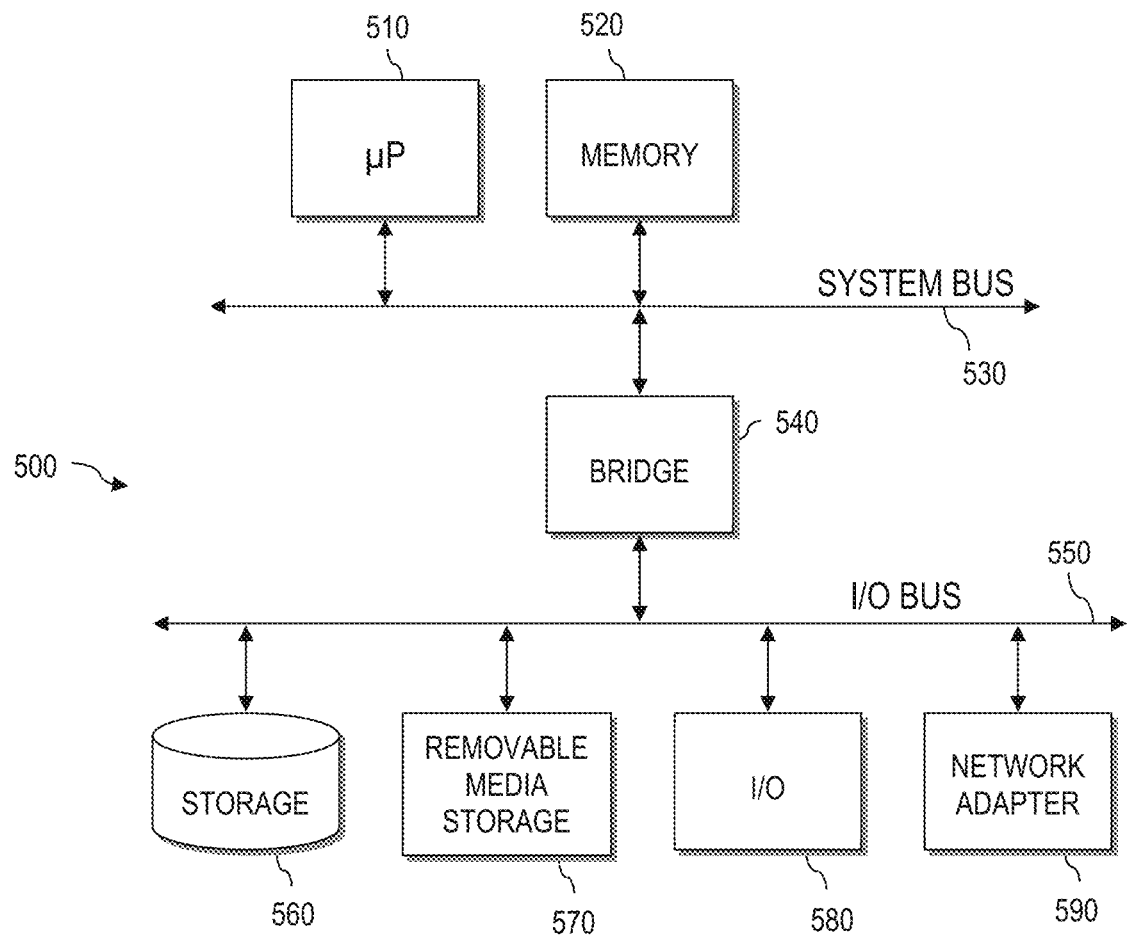
FIG. 5 is a block diagram of a computer system having a computer readable storage medium for implementing functions as described in greater detail herein.

Referring to FIG. 5, a block diagram of a data processing system is depicted in accordance with embodiments herein. Data processing system 500 includes one or more processors 510 connected to memory 520 across a system bus 530. A bus bridge 540 is connected to the system bus 530 and provides an interface to any number of peripherals, e.g., via an I/O bus 550. Example peripherals include storage 560 (e.g., hard drives), removable media storage 570 (e.g., tape drives, CD-ROM drives, FLASH drives, etc.), I/O 680 (e.g., keyboard, mouse, monitor, etc.), a network adapter 590 or combinations thereof.

The memory 520, storage 550, removable media storage 560 or combinations thereof can be used to implement a computer usable storage medium having computer usable program code embodied thereon. The computer usable program code may be executed to implement any aspect herein, for example, to implement any aspect of any of the methods and/or system components illustrated in the preceding FIGURES.

As will be appreciated by one skilled in the art, aspects herein may be embodied as a system, method or computer program product. Furthermore, aspects herein may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium includes, for example, but not limited to, a hard disk, solid state drive, a random access memory (RAM), a read-only memory (ROM), an erasable programmable read-only memory (EPROM), Flash memory, an optical storage device (e.g., CD-ROM), a magnetic storage device, or any suitable combination of the foregoing or other storage hardware. Thus, a computer readable storage medium includes any tangible medium that can contain, or store a program for use by or in connection with an instruction execution system, apparatus, or device.

A computer readable signal medium is a propagated data signal with computer readable program code embodied therein, for example, in baseband or as part of a carrier wave. A computer readable signal medium may be any computer readable medium that is not a computer readable storage medium and that can communicate, propagate, or transport a program for use by or in connection with an instruction execution system, apparatus, or device.

Aspects herein are described herein with reference to flowchart illustrations and/or block diagrams of methods, apparatus (systems) and computer program products according to embodiments herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. This description has been presented for purposes of illustration and description, but is not intended to be exhaustive or limited to the form disclosed. Many modifications and variations will be apparent to those of ordinary skill in the art without departing from the scope and spirit herein. Aspects were chosen and described in order to best explain the principles herein and the practical application thereof, and to enable others of ordinary skill in the art to understand the disclosure for various embodiments with various modifications as are suited to the particular use contemplated.

What is claimed is:

1. A system for controlling the performance of a fleet of materials handling vehicles, comprising:
   a remote processor that is coupled to memory, the remote processor programmed by instructions in the memory that cause the remote processor to wirelessly transmit a set of electronic performance tuning profiles to a materials handling vehicle;
   wherein:
      the materials handling vehicle comprises:
         a control module having a processor that receives the wirelessly transmitted set of electronic performance tuning profiles;
         a display that displays a first widget including indicia associated with at least a subset of the set of electronic performance tuning profiles, wherein the display further simultaneously displays a second widget including indicia associated with a throttle control; and
         a select one of the electronic performance tuning profiles is selected during operation of the materials handling vehicle based upon at least one of a new task, a new application, an encountered geo-location, or a new operating condition;
      upon selection of the electronic performance tuning profile from the displayed subset of electronic performance tuning profiles of the first widget, the control module communicates at least one command across a vehicle network of the materials handling vehicle to modify performance of the materials handling vehicle according to a setting in the selected electronic performance tuning profile; and
      upon the operator of the materials handling vehicle adjusting the throttle control of the second widget, the control module communicates at least one command across the vehicle network of the materials handling vehicle to modify at least one parameter within a corresponding limit defined by the selected electronic performance tuning profile.

2. The system of claim 1, wherein the display includes an attribution that shows the operator of the materials handling vehicle at least one factor that drove the performance tuning adjustment.

3. The system of claim 1, wherein the display outputs a graphical view of the current electronic performance tuning profile, and allows the operator to interact with the graphical view to adjust the performance tuning on the vehicle by adjusting the throttle control.

4. The system of claim 3, wherein the operator can adjust down one or more performance settings, and cannot adjust up any displayed performance settings past a maximum setting defined by the selected electronic performance tuning profile.

5. The system of claim 1, wherein the remote processor retrospects a history over a predetermined time window, of vehicle data to determine whether to remotely trigger a change to a different electronic performance tuning profile.

6. The system of claim 1, wherein the modified performance of the materials handling vehicle comprises at least one of:
   maximum speed;
   maximum acceleration;
   maximum braking;
   maximum lift height;
   maximum lift speed;
   maximum lift acceleration;
   maximum lift deceleration;
   maximum load weight;
   use of blending; or
   use of an automation feature of the materials handling vehicle.

7. The system of claim 1, wherein:
   the remote processor monitors activity of the materials handling vehicle to detect a triggering event, wherein, upon detecting the triggering event, the remote processor wirelessly transmits a command to change at least one of the selected electronic performance tuning profile or a parameter of the selected performance tuning profile; and
   the triggering event is defined by detecting that the materials handling vehicle engaged in a new application.

8. The system of claim 1, wherein:
   the remote processor monitors activity of the materials handling vehicle to detect a triggering event, wherein, upon detecting the triggering event, the remote processor wirelessly transmits a command to change at least one of the selected electronic performance tuning profile or a parameter of the selected performance tuning profile; and
   the triggering event is defined by detecting that the materials handling vehicle engaged in a new task.

9. The system of claim 1, wherein:
   the remote processor monitors activity of the materials handling vehicle to detect a triggering event, wherein, upon detecting the triggering event, the remote processor wirelessly transmits a command to change at least one of the selected electronic performance tuning profile or a parameter of the selected performance tuning profile; and
   the triggering event is defined by detecting that the materials handling vehicle encountered a new operating condition.

10. The system of claim 1, wherein:
   the remote processor monitors activity of the materials handling vehicle to detect a triggering event, wherein, upon detecting the triggering event, the remote processor wirelessly transmits a command to change at least one of the selected electronic performance tuning profile or a parameter of the selected performance tuning profile; and the triggering event is defined by detecting that the materials handling vehicle encountered a new environmental condition.

11. The system of claim 1, wherein:

the remote processor monitors activity of the materials handling vehicle to detect a triggering event, wherein, upon detecting the triggering event, the remote processor wirelessly transmits a command to change at least one of the selected electronic performance tuning profile or a parameter of the selected performance tuning profile; and the triggering event is defined by detecting that an operator logged onto the materials handling vehicle.

12. The system of claim 1, wherein the display outputs an indication of the performance tuning settings.

13. The system of claim 1, wherein:

the display outputs a message to the operator indicating that the control module has received a new electronic performance tuning profile from the remote processor, wherein the display provides an input for the operator to accept or reject the new electronic performance tuning profile; and an acknowledgement is communicated back to the remote processor, the acknowledgement stored in a data source that stores data associated with the vehicle operator.

14. The system of claim 1, wherein a graphical user interface provides a programming interface to create new electronic performance tuning profiles and to store the electronic performance tuning profiles in a database.

15. The system of claim 1, wherein a graphical user interface provides a programming interface to create new rules dictating when a materials handling vehicle should load a new performance tuning profile.

16. A computer implemented process for controlling the performance of a fleet of materials handling vehicles, comprising:

receiving, by a materials handling vehicle during operation thereof, wirelessly transmitted electronic performance tuning profiles, where each electronic performance tuning profile is received from a remote server that:

selects the electronic performance tuning profile from a set of electronic performance tuning profiles based upon detecting at least one of a new task, a new application, an encountered geolocation, or a new operating condition, of the monitored materials handling vehicle;

communicating at least one command across a vehicle network of the corresponding materials handling vehicle to modify performance of the materials handling vehicle according to a setting in the received electronic performance tuning profile;

displaying on a display of the materials handling vehicle, an indication that a performance tuning adjustment was made to the materials handing vehicle during operation thereof, including a first widget having indicia associated with the performance tuning adjustment and a second widget including indicia associated with a throttle control; and receiving a command from the operator of the materials handling vehicle adjusting a throttle control from the second widget and responsive thereto, communicating at least one command across the vehicle network of the materials handling vehicle to modify at least one parameter, within limits defined by the received electronic performance tuning profile.

17. A system for controlling the performance of a materials handling vehicle, comprising:

a remote processor that is coupled to memory, the remote processor programmed by instructions in the memory that cause the remote processor to:

monitor activity during use of a materials handling vehicle; to select an electronic performance tuning profile from a set of electronic performance tuning profiles based upon detecting at least one of a new task, a new application, a new operating condition, or an encountered geolocation of the monitored materials handling vehicle; and transmit the selected electronic performance tuning profile to the materials handling vehicle;

wherein the materials handling vehicle comprises:

a control module having a processor that receives the wirelessly transmitted electronic performance tuning profile, and communicates at least one command across a vehicle network of the materials handling vehicle to modify performance of the materials handling vehicle according to a setting in the received electronic performance tuning profile;

a display on the materials handling vehicle that outputs at least one widget that visually represents an indication that a performance tuning adjustment was made to the materials handing vehicle; and an input/output that allows a vehicle operator to interact with the at least one widget to modify the current electronic performance tuning profile, and upon change to the current electronic performance tuning profile, communicate at least one command across the vehicle network of the materials handling vehicle to modify performance of the materials handling vehicle according to the modified setting in the electronic performance tuning profile.

18. The system of claim 17, wherein the materials handling vehicle operator can only reduce settings below a maximum setting in the current performance profile instance.

19. The system of claim 17 further comprising a graphical user interface running on the display on the materials handling vehicle, the graphical user interface prompting a vehicle operator to accept or decline the received electronic performance tuning profile.

\* \* \* \* \*